United States Patent [19]

Schardt et al.

[11] B 3,914,561

[45] Oct. 21, 1975

[54] APPARATUS AND METHOD FOR TRACING JUMPERS IN A MAIN DISTRIBUTING FRAME

[75] Inventors: Courtney Harold Schardt, Millington; Albert James Schepis, Parsippany, both of N.J.

[73] Assignees: American Telephone and Telegraph, Broadway, N.Y.; Bell Telephone Laboratories, Incorporated, Murray Hill, N.J.

[22] Filed: Apr. 27, 1973

[21] Appl. No.: 355,269

[44] Published under the Trial Voluntary Protest Program on January 28, 1975 as document no. B 355,269.

Related U.S. Application Data

[63] Continuation-in-part of Ser. No. 205,801, Dec. 8, 1971, abandoned.

[52] U.S. Cl. ............ 179/175.3 A; 324/66

[51] Int. Cl.[2] ............ H04B 3/46

[58] Field of Search ...... 179/175.3 A; 324/66, 61 P, 324/76 R; 340/166 R

[56] References Cited

UNITED STATES PATENTS

| | | | |
|---|---|---|---|
| 2,789,268 | 4/1957 | Bechtel et al. | 324/66 |
| 2,869,077 | 1/1959 | Houk | 179/175.3 A |
| 3,288,943 | 11/1966 | Bohnenblust | 179/175.3 A |
| 3,476,888 | 11/1969 | Rollins et al. | 179/175.25 |
| 3,535,692 | 10/1970 | Papke | 340/166 R |
| 3,644,687 | 2/1972 | Richards | 179/175.3 A |

*Primary Examiner*—Kathleen H. Claffy
*Assistant Examiner*—Douglas W. Olms
*Attorney, Agent, or Firm*—A. D. Hooper

[57] ABSTRACT

An apparatus and method for tracing jumpers in a wiring rack such as the main distributing frame of a telephone central office utilizes a sensor such as a magnetic core around cables accessing the frame. Sensors along respective horizontal and vertical divisions of the frame are interconnected by respective address wires to form a location matrix. An appropriate identification signal is applied to either the address wires sequentially or to the jumper to be traced and the jumper or address wires, respectively, are monitored to detect a signal induced thereon by the appropriate sensor responding to the indentification signal. The particular address wires having a signal thereon simultaneous with the particular jumper specify the location of the activated sensor and hence the location of the end of the jumper.

16 Claims, 8 Drawing Figures

APPARATUS AND METHOD FOR TRACING JUMPERS IN A MAIN DISTRIBUTING FRAME

This is a continuation-in-part of now abandoned application Ser. No. 205,801 filed Dec. 8, 1971.

BACKGROUND OF THE INVENTION

1. Field of the Invention

This invention relates to apparatus and methods for tracing conductors and in particular to an apparatus and method for locating the ends of jumpers in a main distributing frame of a telephone central office.

2. Description of the Prior Art

Space requirements for the telephone plant are becoming increasingly critical especially in urban areas. Nowhere is this more evident than with regard to telephone central offices. Central offices contain wiring racks commonly known as main distributing frames through which multitudes of jumpers are routed for connecting switching equipment to outside plant cables and the like. When a telephone listing is changed, it is necessary to terminate the connection between the outside plant wire pair associated with the listing and the switching equipment. Standard operating procedure in this regard is to disconnect both ends of the jumper which interconnects the wire pair and switching equipment, remove the jumper from the main distributing frame, and update the wiring records to reflect the change. Unfortunately, this standard procedure has not been rigidly followed and dead jumpers which may be disconnected at one or both ends have been left in the main distributing frame and the wiring records do not reflect the actual situation. This gradual accumulation of dead jumpers together with the increase of live jumpers has reached the stage in some central offices where there is little or no room left for the addition of new jumpers required by new telephone listings. Further, the records are becoming increasingly unreliable. Accordingly, it is becoming mandatory that the accumulation of dead jumpers be removed and that the wiring records be corrected.

Before a jumper can be removed or the wiring records thereon updated, it must be ascertained whether the jumper has been disconnected on one or both ends. Otherwise, for example, damage may occur to wiring terminals when a removal force is applied to the jumper. Thus, the jumper must be traced from one known end through the maze of jumpers in the main distributing frame to locate its other end. The tracing is normally accomplished at present by placing an identification signal, such as a tone, on the jumper at its known end and following this signal through the frame with a hand carried probe or detector such as a capacitance or inductance probe or wand. One major disadvantage of this method of jumper tracing is the amount of time involved. Often as much as twenty to thirty minutes may be required to trace a single jumper. Another disadvantage is that jumpers near the bottom of a pile of such jumpers cannot be effectively traced because the jumper is shielded by the surrounding jumpers so that the identification signal cannot be detected. Still another disadvantage is that the required level of the identification signal may cause interference with working circuits.

Another method of tracing and removing dead jumpers is disclosed in U.S. Pat. No. 3,675,315 issued to C. W. Zebe on July 11, 1972 and assigned to the assignee of this invention. This application discloses tracing a jumper by inserting one end thereof in a tube, applying a tension to the jumper and then pushing the tube along the jumper to trace it to its other end. This method is advantageous when the jumper must be loosened from the jumper pile before it can be physically pulled therefrom. However, this tracing method is still slower than desired for jumpers which can readily be removed once it has been ascertained that the ends thereof are disconnected.

Accordingly, it is an object of this invention to reduce the time required for tracing jumpers in a telephone central office wire frame.

Another object is to improve the apparatus and methods for tracing jumpers so that any such jumper can be traced regardless of its position in the surrounding pile of jumpers.

Another object is to simplify the tracing of jumpers in a wiring rack.

SUMMARY OF THE INVENTION

The foregoing objects and others are achieved in accordance with this invention by a jumper tracing apparatus and method which utilizes sensors such as magnetic cores around the cables accessing the main distributing frame. The sensors along respective horizontal and vertical divisions of the frame are interconnected by respective address wires to form a location matrix, the unique crosspoints of which are defined by the intersections of respective horizontal and vertical wires. An appropriate identification signal is applied to either the jumpers to be traced or to the address wires sequentially and the address wires or jumpers, respectively, are monitored to detect a signal induced thereon by the appropriate sensor responding to the identification signal. The particular address wires having a signal thereon simultaneous with the jumper to be traced specify the location of the activated sensor and hence the location of the end or ends of the particular jumper. For example, if the identification is placed on a jumper, this signal will activate the sensor where the jumper is terminated which in turn induces a signal on the associated address wires. Address wires having the induced signal thereon specify the location of the activated sensor and hence the location of the end of ends of the jumper. On the other hand, the identification signal can be applied sequentially to the address wires until an induced signal appears on the jumper of interest. The address wires then containing the identification signal specify the location of the activated sensor.

BRIEF DESCRIPTION OF THE DRAWING

The invention will be more fully comprehended from the following detailed description and accompanying drawing in which the same numbers are utilized throughout to designate the same elements and in which.

DETAILED DESCRIPTION

Figure 1:
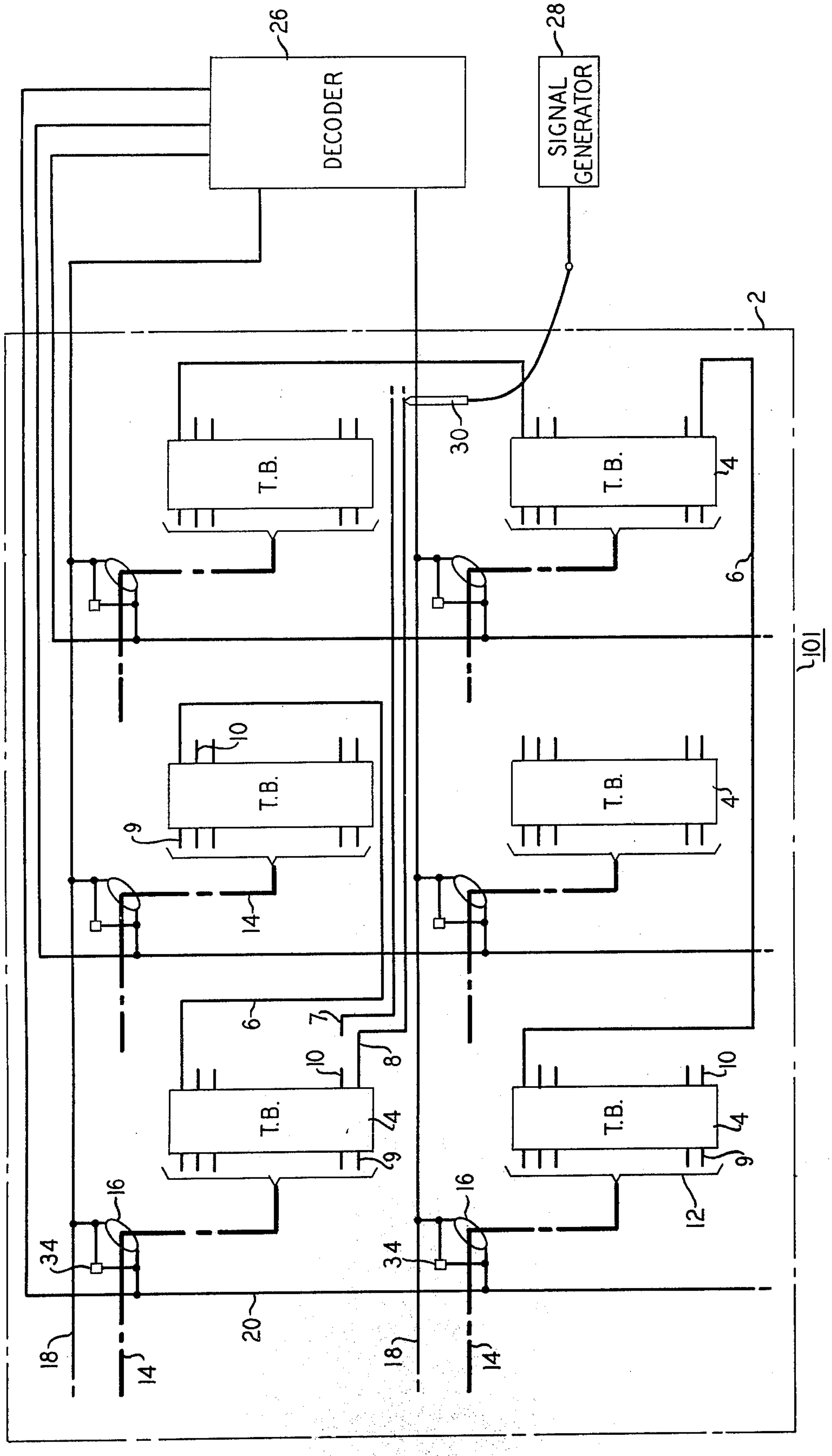
FIG. 1 is a schematic representation of one embodiment of this invention.

Referring now to FIG. 1, there is shown a first embodiment of apparatus 101 for tracing jumpers in a wiring rack such as a main distributing frame of a telephone central office. The term jumpers as used herein is used generically to include single wires, wire pairs or other conductors used for interconnections in the frame. The interconnections in a central office are made by routing jumpers 6 through the main distributing frame 2 which comprises a plurality of terminal blocks 4 arranged essentially in rows and columns and joined by wiring trays not shown in which jumpers 6 lie. A frame 2 having six terminal blocks 4 arranged in two rows and three columns is shown for illustration only. A typical central office main distributing frame may have hundreds or even thousands of terminal blocks arranged in many columns and rows or vertical and horizontal division and connected by hundreds of feet of wiring trays. Each terminal block 4 may have one hundred or more input terminals 9 and a like number of interconnection terminals 10. Each input terminal 9 is electrically connected to its corresponding interconnection terminal 10 by the internal structure of terminal block 4. The wire pair from a subscriber station normally enters the central office in a cable 14 and is connected to dedicated input terminals 9 on a vertical terminal block 4. This wire pair is then connected to a horizontal terminal block by jumpers 6 which are connected to interconnection terminals 10. From the horizontal terminal block the wire pair is then connected to switching equipment by another cable 14. The designation of vertical and horizontal terminal blocks is not essential to the description of this invention and accordingly only a single type of terminal block is illustrated and discussed herein.

The jumpers 6 connected to interconnection terminals 10 are routed in a multitude of directions depending upon the location of the corresponding terminal blocks 4 to which the jumpers 6 are to be connected. At one extreme, jumper 6 from a terminal block 4 on one end of frame 2 may connect to a terminal block 4 on the opposite end of frame 2 which requires a wiring run of many feet including changes in column and row location. This random routing creates a maze of jumpers 6 within the wiring trays which eliminates the possibility of visually tracing any particular jumper 6 for any substantial distance. However, on one side of each terminal block 4, usually the side having terminals 9, it is readily apparent that no such wiring maze exists. Instead, the conductors 12 connected to this side of the terminal block are dressed into cable 14 which provides connections to the subscriber stations or the switching equipment as previously mentioned.

Figure 4:
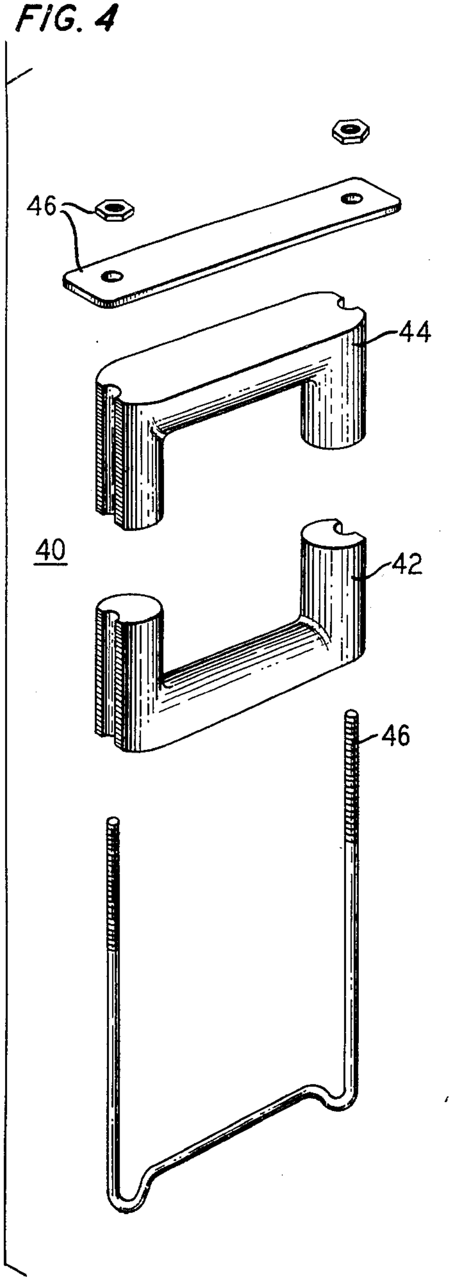
FIG. 4 is an exploded perspective view of a sensor which can be utilized with the systems of FIG. 1 and FIG. 5.

A suitable electrical or magnetic field sensor 16 is placed around each cable 14 connected to a terminal block 4. For example, as shown in FIG. 4, a split toroid or ferromagnetic core 40 comprising two core halves 42 and 44 connected by mounting hardware 46 can be installed around existing cables 14 without the necessity for disconnecting the cables. Horizontal and vertical address wires 18 and 20, respectively, are connected to sensors 16 so that they are responsive to any change in the magnetic field of sensor 16. A single horizontal address wire 18 interconnects all sensors 16 associated with terminal blocks 4 in a particular level, row or horizontal division of frame 2. Likewise a single vertical address wire 20 interconnects all sensors 16 associated with terminal blocks 4 in particular vertical division or column thereby forming a location matrix. The location of each sensor 16, and hence the location of each terminal block 4, is specified by the combination or intersection of a particular horizontal wire 18 with a particular vertical wire 20.

Figure 2:
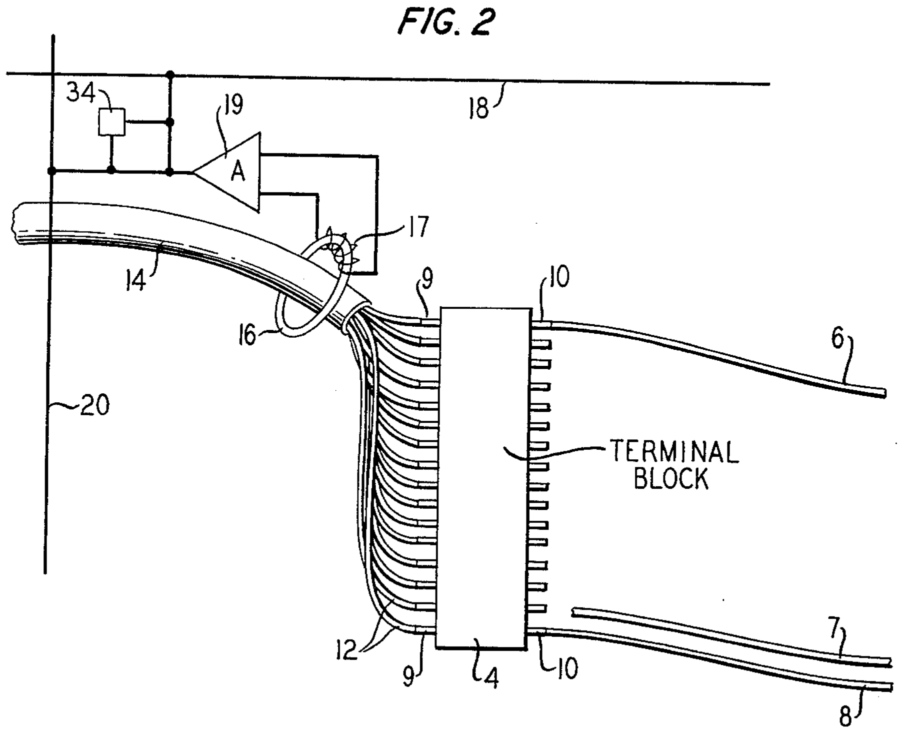
FIG. 2 is an enlarged schematic representation of one possible design for the apparatus utilized at a single terminal block of FIG. 1.

As illustrated in FIG. 2, sensor 16 comprising a magnetic core can have thereon a coil 17 which responds to any change in magnetic field of sensor 16 caused by an appropriate identification signal in cable 14. Coil 17 is connected through amplifier 19, such as an operational amplifier known in the art, to both the horizontal and vertical address wires 18 and 20, respectively, so that a signal is produced in each of these wires when sensor 16 is activated.

Figure 3:
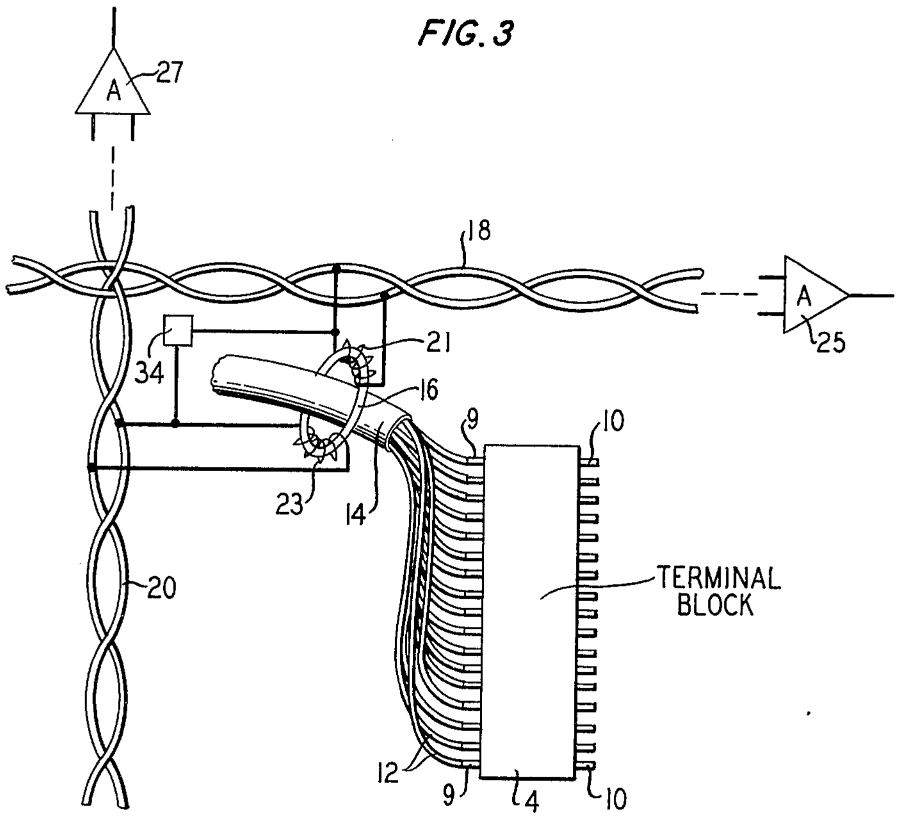
FIG. 3 is an enlarged schematic representation of another embodiment of the apparatus utilized at a single terminal block of FIG. 1.

As an alternative embodiment sensor 16 can comprise a magnetic core 16 having two coils 21 and 23, respectively, connected to address wires 18 and 20 which comprise twisted wire pairs as shown in FIG. 3. In this embodiment only one amplifier 25 or 27, respectively, need be provided for each horizontal or vertical address wire 18 or 20 rather than for each crosspoint.

Horizontal and vertical address wires 18 and 20, respectively, are connected to a decoder 26 which transforms the signals thereon into an output showing the location of the sensor 16 which has been activated. Decoder 26 can have several embodiments. One simple embodiment is for each incoming address wire 18 to 20 to control a lamp. Thus, an operated lamp in one group could indicate the horizontal address wire 18 which has a signal thereon and another operated lamp in a different group could indicate the vertical address wire 20 having a signal thereon. Accordingly, the row and column location of the activated sensor would be indicated by the operated lamps.

In another embodiment decoder 26 can comprise a lamp for each crosspoint of the location matrix. The horizontal and vertical address wires 18 and 20 could be combined by suitable gates to operate a single lamp associated with each crosspoint location and thereby indicate the location of the activated sensor 16.

In still another embodiment, decoder 26 can comprise a numeric display which can be derived from the signals on the address wires by gating circuits known in the art.

The jumpers of particular interest in frame 2 are the dead jumpers such as jumper 7, which is disconnected at both ends, or jumper 8, which is disconnected at only one end. Before a dead jumper can be removed it must be ascertained that both ends thereof are disconnected and this requires tracing the jumper through the frame to locate its ends. Jumpers 6, 7, and 8 are traced by placing an identification signal thereon and determining where such jumper is terminated, if at all, by the previously described sensing apparatus which is activated by the identification signal.

An identification signal is produced by signal generator 28, known in the art, and applied to jumper 6, 7, or 8 through a probe 30. The identification signal can comprise either a continuous wave signal or a train of voltage pulses which will produce a current in the jumper if there is a completed connection. For example, if jumper 6 or 8 is connected to a terminal block 4 which has an outside plant cable connected thereto, the identification signal produces a current flow in the appropriate wire pair of such cable which returns to ground through line capacitance. Switching equipment likewise normally presents a completed circuit to the cables connected therewith. The exact type of identification signal used and the magnitude and frequency thereof will depend upon such features as the type of core used, the signal-to-noise ratio desired, the maximum permitted voltage on the wire loop, and the desired margin against crosstalk.

When the identification signal from generator 28 is placed on a jumper such as jumper 8, the current produced traverses jumper 8 and passes through the terminal block 4 to which jumper 8 is connected into the associated wire pair of cable 14. The sensor 16 around this particular cable 14 responds to this current thereby causing a change in its magnetic field which produces signals in the coil or coils associated with the sensor 16. These signals in the coil are then coupled to the respective horizontal and vertical address wires 18 and 20 associated with the particular sensor 16 as previously discussed with respect to FIGS. 2 and 3. The signals on the address wires 18 and 20 are transmitted to decoder 26 where they are used to produce readouts showing the location of the excited sensor 16 and thereby the location of terminal block 4 to which the other end of jumper 8 is connected.

When the identification signal is coupled to a jumper such as jumpers 6 having both ends connected to terminal blocks 4, two different sensors 16 are activated. Thus readouts are obtained on the location of the terminal blocks 4 to which both ends of jumper 6 are connected.

When the identification signal is coupled to a jumper such as jumper 7 already having both ends disconnected, no sensor 16 is excited. Such jumper 7 can then be removed without further checking.

Once the specific terminal block 4 to which the ends or end of a jumper 6 or 8 are connected has been located, the specific terminal 10 on that terminal block 4 must be ascertained. This can be readily accomplished by transmitting an audible signal such as a continuous buzzing signal or tone from generator 28 and then rapidly probing the set of terminals 10 with a probe and associated handset or headset known in the art to detect the audible signal. The jumper 6 or 8 can then be disconnected from its respective terminal 10 and removed from frame 2 if desired.

Figure 5:
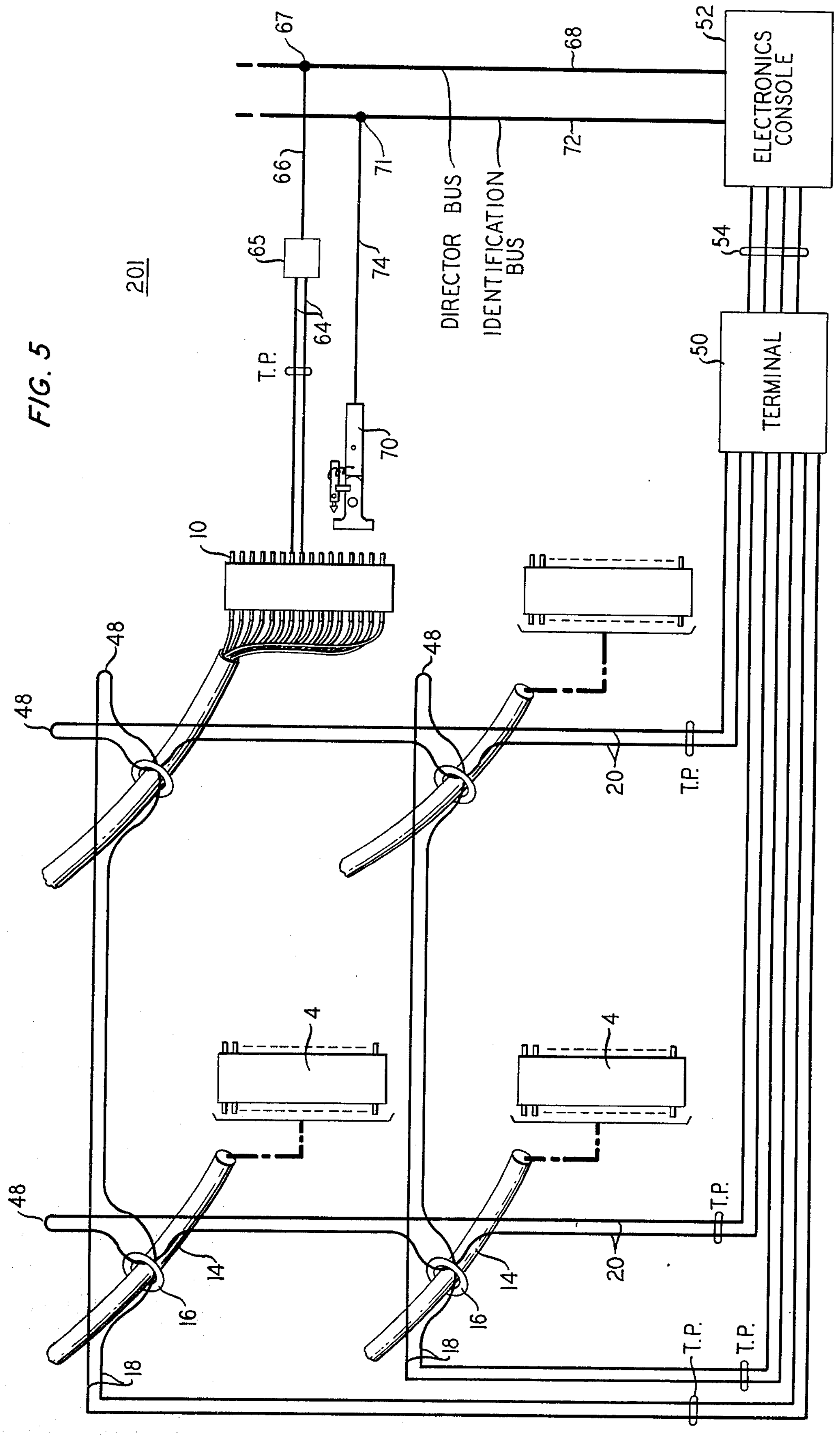
FIG. 5 is a schematic representation of a second embodiment of this invention.

As previously indicated, a system substantially converse to the foregoing system can be readily developed from the principles of this invention. In such a converse system, the identification signal is placed on the address wires sequentially and the jumper to be traced is monitored until an induced signal appears thereon. This converse system is advantageous because the relatively high level identification signal is not placed on the jumpers where it may interfere with working circuits. Rather only the relatively low level induced signal appears on the jumpers. This converse system 201 is schematically illustrated in FIG. 5 and will now be discussed in detail with reference thereto.

System 201 includes the previously discussed location or address matrix having horizontal and vertical address wires 18 and 20, respectively, which in this embodiment advantageously comprise twisted wire pairs. One wire of each pair can be threaded through the appropriate sensors 16 and electrically connected to the other wire of the pair at the end 48 of the runs to form a single turn winding around sensors 16. The address wires 18 and 20 are terminated on terminal strips within terminal 50 and connected therethrough to electronics console 52 over wires or conductors 54 which will be discussed in more detail subsequently.

Figure 6:
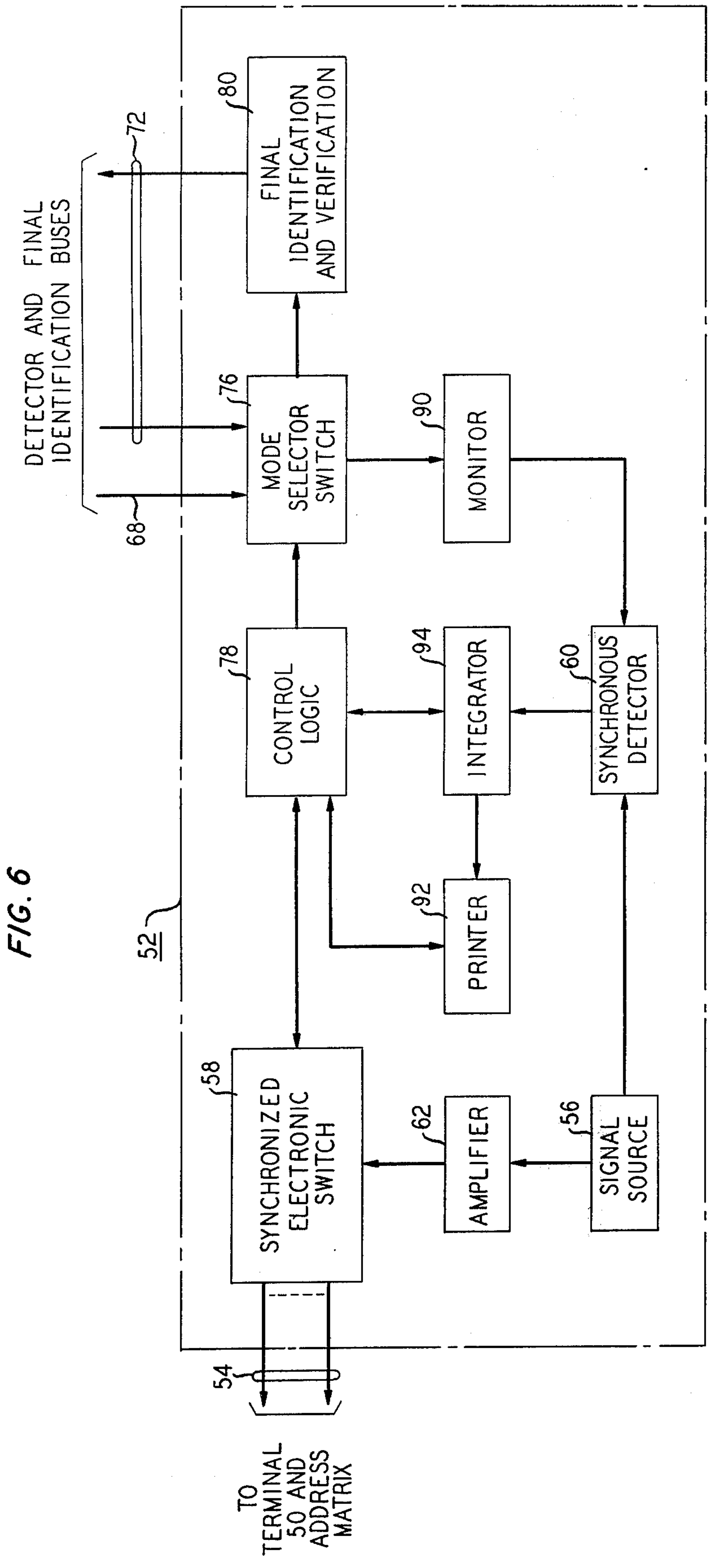
FIG. 6 is a more detailed schematic representation of the console utilized in the system of FIG. 5.

As shown in more detail in FIG. 6, electronics console 52 includes a signal source 56, a synchronized switch 58, control logic 78 for controlling and monitoring the operation of switch 58, and a synchronous detector 60. An appropriate identification signal, such as a 25 KHz continuous wave signal having a level of several hundred milliamps peak-to-peak, is transmitted from signal source 56 via an appropriate amplifier 62 known in the art to switch 58 where it is applied through terminal 50 to address wires 18 and 20 to sequentially energize sensors 16. The jumper 64 to be traced is connected via connector 65, test cord 66 and detector bus 68 to detector 60 which is synchronized with signal source 56 and switch 58. Bus 68 can comprise a permanently wired conductor within the main frame having appropriately spaced sockets 67 into which test cord 66 can be plugged to permit free movement of operating personnel. When the sensor associated with any terminal block to which jumper 64 is connected is energized, i.e., when both the horizontal and vertical address wire threaded through the sensor 16 have the identification signal thereon, a signal above a preselected threshold is induced within the jumper 64 which is transmitted to and detected by detector 60. Since detector 60 is synchronized with switch 58, the address wires activated when the induced signal appears are known and consequently the location of the particular sensor 16 and the associated terminal block 4 to which jumper 64 is connected is known.

The particular terminal on block 4 to which jumper 64 is connected is determined by transmitting a localization signal such as a tone from console 52 to a probe 70 via an identification bus 72 and a test cord 74 plugged into bus 72 at sockets 71 as previously described with respect to cord 66 and bus 68. As shown in FIG. 6, console 52 can include a mode selector switch 76 which is switched to a localization or final identification mode after the appropriate terminal block has been determined. A localization signal is then transmitted from source 56 via amplifier 62, switch 58 and control logic 78 to mode selector switch 76 where it is directed to probe 70 via final identification and verification apparatus 80, which can contain amplifier and buffering circuits, bus 72 and cord 74.

Figure 7:
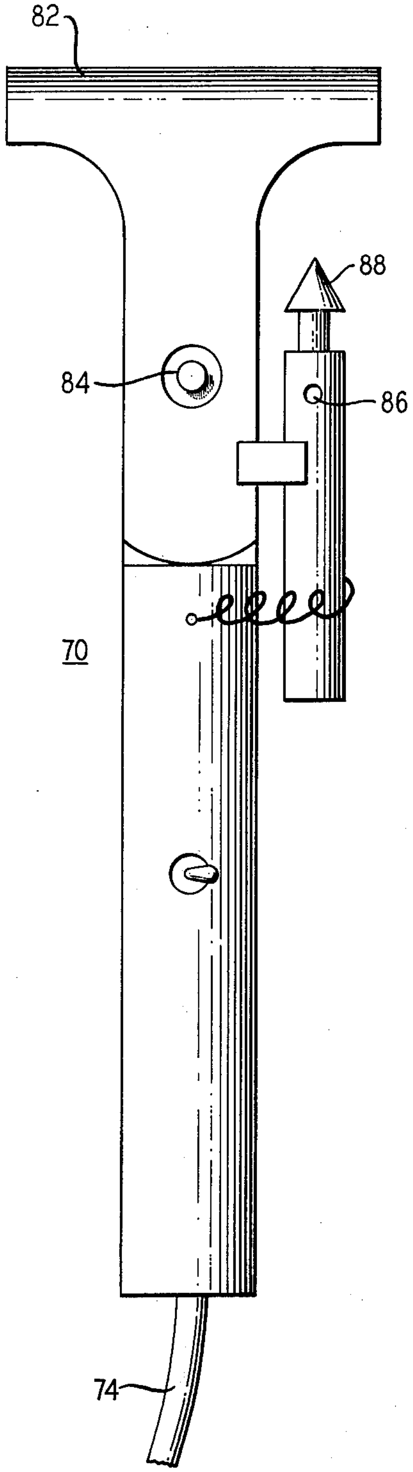
FIG. 7 is a more detailed view of the probe shown in FIG. 5.

One example of a probe 70 which might be used is shown in FIG. 7. Probe 70 includes a head 82 having a radiating coil therein and a speaker 84. As probe 70 is moved over terminals 10 of block 4 a signal is induced in jumper 64 by the radiation of the localization signal from probe 70. The level of this signal depends upon the proximity of probe 70 to the terminal 10 of interest. A circuit for this signal is completed through cord 66 and bus 68 back to detector 60 in console 52. Apparatus 80 is then caused to provide a tone to speaker 84 in probe 70 which has a level responsive to the induced signal level detected by detector 60 on jumper 64. Hence the intensity of the output from speaker 84 depends on the proximity of probe 70 and terminal 10 of interest and can be used to zero in on the terminal. However, the definition provided by the radiating coil in head 82 may not be sufficient to establish the exact terminal of interest. Accordingly, a verification tip 88 is used to physically contact different ones of terminals 10 in the immediate vicinity of the correct terminal until the correct terminal is contacted. When this physical contact with the correct terminal is made, the resistance in the completed path from apparatus 80 through tip 88, to jumper 64 and back to console 52 is sufficiently low to allow the flow of sufficient current therethrough to operate a light 86 on tip 88 to verify the terminal.

Electronics console 52 can also include additional features for enhancing the operation thereof. Monitor apparatus 90 can be used for determining the status of a jumper so that tracing operations will not be performed thereon while the jumper is part of a busy line. A printer 92 or other output device which is controlled by appropriate circuitry such as integrator 94 that responds to detector 60 can provide a permanent physical record of the jumper tracing results. For example, for increased sensitivity the threshold of detector 60 might be set low enough to respond to signals induced on jumper 64 when only one address wire associated with a respective sensor is energized. However, the output of detector 60 would be integrated over a period of time by integrator 94 so that the printer would be operated only when the induced signal corresponds to a valid location reading, i.e., when both address wires to the respective sensor have been energized for a minimum amount of time during a specified interval. Control logic 78 also provides an input to printer 92 to insure that the output therefrom is coordinated with the address wires being energized at a particular time.

Figure 8:
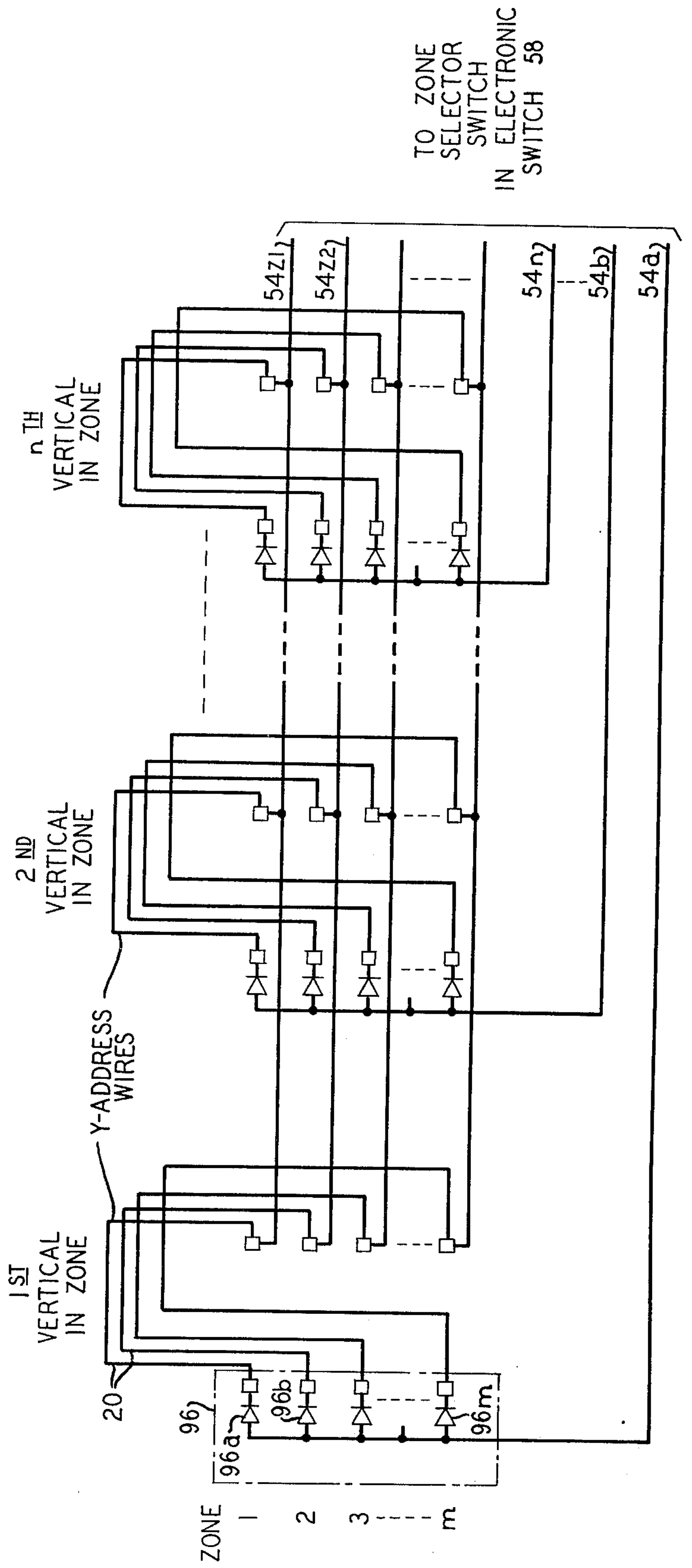
FIG. 8 is a schematic representation of a strapping arrangement for the address wires utilized in the system of FIG. 5.

Some cross connect circuits within a large wiring frame may contain more than one jumper. Accordingly, whenever a signal appears on one jumper within such a circuit it will also appear on the other jumpers thereby producing multiple location readings, i.e., there will be location readings for each jumper within the circuit even though it is desired to locate the end of only one of these jumpers. Jumpers having both ends connected will have two associated readings, i.e., one for each end. With many readings it is hard to associate the readings with particular jumpers. In order to reduce the number of readings in such circuits, the wiring frame can be divided into zones so that on a random basis only one or two location readings will occur in a single zone and these readings will likely be associated with a single jumper. The sensors within a respective zone are sequentially energized as explained previously and the sensor energization is then repeated in the next zone until all zones have been checked. The address wires within the respective zones in essence form an independent location matrix for each zone. However, respective wires from the different zones can be strapped together by an appropriate gating arrangement to reduce the total number of address wires required for the wiring frames. For example, electronic switch 58 can include a zone selector switch for selecting the specific zones. As illustrated in FIG. 8, one of the conductors 54*a* connecting console 52 to terminal 50 can fan out through diode network 96 into *m* vertical address wires which serve the first vertical divisions in *m* respective zones. Only one of these first vertical address wires is activated at any given time as determined by the zone selector switch in electronic switch 58 which completes the circuit for the address wires. For example, if zone 2 is designated, the identification signal on conductor 54*a* would pass through diode 96*b* of network 96 into the first vertical address wire in zone 2 and then return to switch 58 over a conductor 54*z*2 associated with zone 2. Likewise, conductor 54*b* fans out into *m* second vertical address wires, etc. The horizontal address wires for the various zones can be strapped together by similar diode networks at terminal 50 so that only a limited number of conductors 54 actually interface with console 52.

It should be readily apparent from the foregoing that the entire procedure for determining the exact terminal or terminals 10 to which a particular jumper is connected through the use of either one of the described embodiments of the invention requires a very short time. In the first embodiment the location readout is substantially instantaneous with the placing of the identification signal on the jumper. In the second embodiment all of the sensors can be energized sequentially and the location of any jumper determined within a very few seconds. This represents a significant improvement over the presently used systems which require several minutes on the average to locate the ends of a single jumper. Additionally, applicants apparatus and method are not subject to the limitations imposed imposed by the physical size of the jumper pile.

While the invention has been described with reference to specific embodiments thereof, various modifications thereto might be made. For example, a single distinct address wire could be used to specify the location of each sensor rather than using the crosspoint of two wires as described herein. Various types of identification signals might be used depending upon the particular type of wiring frame involved. All such modifications fall within the spirit and scope of the following claims.

What is claimed is:

1. Apparatus for determining the locations of the ends of conductors in a wiring frame having a plurality of terminal blocks located in substantially horizontal and vertical divisions of said frame, said conductors being adapted for connection to and interconnecting said blocks, comprising in combination:

sensing means associated with each of said blocks;

first and second sets of address wires respectively interconnected with said sensing means in respective said horizontal and vertical divisions so that the location of each of said sensing means is specified by the intersection of a pair of said address wires comprising a respective address wire from said first set and a respective address wire from said second set;

means for simultaneously applying an identification signal to any selected said pair of address wires, said sensing means having said location specified by said selected pair of address wires being responsive to said identification signal for producing an output signal on any one of said conductors connected to said block associated with said sensing means; and means for monitoring one of said conductors to detect said output signal thereon, said location of said end of said one conductor being specified by said pair of address wires having said identification signal thereon when said output signal appears on said one conductor.

2. Apparatus in accordance with claim 1 wherein said applying means further includes means for sequentially applying said identification signal to a plurality of said pairs, said monitoring means includes means synchronized with said applying means for indicating said pair of address wires having said identification signal thereon when said output appears on said one conductor.

3. Apparatus in accordance with claim 2 wherein said applying means includes a signal source for generating said identification signal and switch means for connecting said identification signal to said pairs of address wires; and said monitoring means includes a detector synchronized with said switch means for detecting said output signal on said one of said conductors, and a printer responsive to said detector for identifying said pair of address wires having said identification signal thereon.

4. Apparatus in accordance with claim 3 wherein said applying means further includes means for dividing said address wires into a plurality of zones comprising:

a zone selector switch for designating said zones;

conductors for transmitting said identification signal to said pairs of address wires; and diode gating means for connecting respective horizontal and respective vertical address wires within respective ones of said zones to a common one of said conductors so that said identification signal can be applied to said address wires within any respective zone by said zone selector switch.

5. Apparatus in accordance with claim 1 wherein each of said terminal blocks includes a plurality of terminals, and said apparatus includes means for probing said terminals on said blocks to establish the specific one of said terminals to which said one conductor is connected whereby said location of said end is more precisely defined.

6. Apparatus in accordance with claim 5 wherein said probing means includes:

a signal source for generating a localizing signal; and a probe responsive to said localizing signal for producing a first signal in said one conductor proportional to the proximity of said probe to said specific one of said terminals to which said one conductor is connected, said probe including means for indicating said proximity so that said specific terminal can be located.

7. Apparatus in accordance with claim 6 wherein said indicating means includes a speaker for providing an audible signal proportional to said proximity, and a light for indicating when said specific terminal is contacted.

8. Apparatus for locating the ends of conductors in a wiring frame having a plurality of terminal blocks located in substantially horizontal and vertical divisions of said frame with cables connected thereto, said conductors being adapted for mounting to said blocks for interconnecting said blocks and thereby said cables comprising, in combination:

means for applying an identification signal to one of said conductors so that said identification signal is transmitted to any one of said blocks to which said conductor is mounted and thereby to said cable connected thereto;

sensing means associated each of said terminal blocks; and first and second address wires respectively interconnecting said sensing means associated with said blocks within a respective one of said horizontal and vertical divisions, said sensing means being respective to said identification signal to produce location signals in said first and second address wires interconnected therewith so that the location of any one of said blocks to which said identification signal is transmitted is specified by the combination of said first and second address wires having said location signals thereon.

9. Apparatus in accordance with claim 8 including means for detecting said location signals on said first and second address wires and producing an output indicating the location within said frame of said terminal blocks to which said identification signal is transmitted.

10. Apparatus in accordance with claim 8 wherein each of said terminal blocks includes a plurality of terminals, and including means for probing said terminals on said terminal blocks to establish the specific one of said terminals to which said conductor is mounted whereby the locations of said ends are more precisely defined.

11. Apparatus for locating the ends of conductors in a wiring frame having a plurality of terminal blocks located in substantially horizontal and vertical divisions of said frame with cables connected thereto, said conductors being adapted for mounting to said blocks for interconnecting said blocks and thereby said cables comprising, in combination:

means for applying an identification signal to one of said conductors so that said identification signal is transmitted to any one of said blocks to which said conductor is mounted and thereby to said cable connected thereto;

sensing means comprising a magnetic core around each of said cables associated with said respective terminal blocks;

first and second sets of address wires respectively interconnecting said cores in respective ones of said horizontal and vertical divisions so that the intersections of said first and second sets of address wires define the locations of respective cores, said cores being responsive to said identification signal in said cables for producing location signals in said address wires forming said respective intersections; and means for detecting said location signals so that said locations of said intersections within said frame can be determined.

12. In a telephone system crossconnection distributing frame having a plurality of terminal means located within substantially horizontal and vertical divisions of said frame, each of said terminal means having first and second sets of associated terminals respectively connected through said terminal means, a first set of conductors connected to said first set of terminals and proceeding away from said first set of terminals as a unit in the form of a discrete multiconductor cable, a second set of conductors adapted to be connected to said second set of terminals for interconnecting said terminal means, said second set of conductors proceeding away from said second set of terminals in a plurality of directions as individual conductors, apparatus for locating the ends of said conductors of said second set comprising, in combination:

means for placing an identification signal on said conductors of said second set which is transmitted to any one of said terminal means to which said conductors of said second set are connected and thereby to said discrete cables connected to said terminal means;

a magnetic core responsive to said identification signal around each of said discrete cables adjacent an associated one of said terminal means;

first and second substantially orthogonal sets of address wires interconnecting said cores along said respective horizontal and vertical divisions so that the location of each of said cores is specified by a respective intersection of said first and second set of address wires, said cores producing location signals in said address wires forming said respective intersections when said identification signal appears in said cable associated with said core; and means for detecting said location signals and indicating the location of said associated one of said terminal means whereby said ends of said conductors of said second set can be located.

13. In a telephone system crossconnection distributing frame having a plurality of terminal means located within substantially horizontal and vertical divisions of said frame, each of said terminal means having first and second sets of associated terminals respectively connected through said terminal means, a first set of conductors connected to said first set of terminals and proceeding away from said first set of terminals as a unit in the form of a discrete multiconductor cable, a second set of conductors adapted to be connected to said second set of terminals for interconnecting said terminal means, said second set of conductors proceeding away from said second set of terminals in a plurality of directions as individual conductors, apparatus for locating the ends of said conductors of said second set comprising, in combination:

a magnetic core around each of said discrete cables adjacent an associated one of said terminal means;

first and second substantially orthogonal sets of address wires interconnecting said cores along said respective horizontal and vertical divisions so that the location of each of said cores is specified by a respective intersection of said first and second set of address wires;

means for sequentially placing an identification signal on respective pairs of said address wires which sequentially energizes said cores associated with said respective pairs to produce location signals on said conductors of said second set associated with respective cores and means for detecting said location signal on one of said conductors of said second set, whereby said location of said core and thereby the locations of said ends of said one conductor are specified by said address wires having said identification signal thereon when said one conductor has said location signal thereon.

14. In a wiring frame having a plurality of terminal blocks, conductors adapted for interconnecting said terminal blocks, a plurality of cables which are mounted to respective ones of said terminal blocks and connected to said conductors therethrough, and magnetic cores about respective ones of said cables, the method of locating the ends of said conductors comprising the steps of:

interconnecting said cores with a matrix of address wires so that the location of each core is defined by a crosspoint of said matrix;

placing an identification signal on one of said conductors so that said signal is transmitted to any one of said terminal blocks to which said conductors is connected and thereby to said cable associated therewith, said core about said cable being responsive to said identification signal to change the magnetic field thereof and produce location signals on said address wires interconnected therewith; and detecting said location signals on said address wires so that the location of said cores and thereby the location of said terminal blocks having said identification signal thereon can be determined.

15. The method of claim 14 wherein each of said terminal blocks includes a plurality of terminals and further including the step of testing each of said terminals on any one of said terminal blocks having said identification signal thereon so that the location of said ends can be more precisely defined.

16. In a wiring frame having a plurality of terminal blocks arranged in substantially horizontal and vertical divisions, a first conductor adapted for connection to and interconnecting said blocks, and cables connected to respective ones of said blocks and therethrough to said first conductor when said first conductor is connected to said respective block, the method of determining the location of an end of said first conductor comprising the steps of;

installing sensors about said cables;

interconnecting said sensors within respective horizontal and vertical divisions with second conductors from two respective sets of second conductors to form a location matrix so that said sensors have locations specified by the intersections of pairs of said second conductors comprising one of said second conductors from each of said two respective sets;

placing an identification signal on either said first conductor or on respective said pairs of second conductors so that said identification signal is transmitted to any one of said sensors to which said first conductor or a respective one of said pairs of second conductors is connected, said sensor being responsive to said identification signal to produce an output signal on any one of said pairs of second conductors or on said first conductor, respectively, connected thereto; and detecting said output signal to determine which respective one of said pairs of second conductors has either said identification signal or said output signal thereon when said first conductor has the other of said signals thereon, whereby said location of said sensor and thereby said location of said end of said first conductor is specified.

* * * * *